United States Patent
Izumitani et al.

[15] 3,656,976

[45] Apr. 18, 1972

[54] STABLE FLUOROPHOSPHATE OPTICAL GLASS

[72] Inventors: Tetsuro Izumitani, Tokyo; Seiichi Toda, Hanno, both of Japan

[73] Assignee: Haya Glass Works, Limited, Tokyo, Japan

[22] Filed: May 15, 1970

[21] Appl. No.: 37,763

[30] Foreign Application Priority Data

May 24, 1969 Japan....................................44/40455

[52] U.S. Cl. ..........................................106/47 Q, 106/47 R
[51] Int. Cl. .................................................C03c 3/00
[58] Field of Search .......................106/47 Q, 47 R

[56] References Cited

UNITED STATES PATENTS

| | | | |
|---|---|---|---|
| 3,492,136 | 1/1970 | Bromer et al. | 106/47 Q |
| 2,511,228 | 6/1950 | Sun et al. | 106/47 Q |
| 2,456,033 | 12/1948 | Sun | 106/47 Q |

FOREIGN PATENTS OR APPLICATIONS

| | | | |
|---|---|---|---|
| 909,679 | 10/1962 | Great Britain | 106/47 Q |

OTHER PUBLICATIONS

Rawson, H.; Inorganic Glass Forming Systems; London, 1967, p. 173 (TP857R3)

*Primary Examiner*—Tobias E. Levow
*Assistant Examiner*—W. R. Satterfield
*Attorney*—Cushman, Darby & Cushman

[57] ABSTRACT

Fluoro-phosphate optical glass having an extremely low tendency to devitrify, a high water-durability and a low brittleness is produced by incorporation boron oxide in the binary system phosphoric anhydride-metal fluorides, wherein said metal fluorides consists of alkaline earth metal fluorides such as $MgF_2$, $BaF_2$ and $CaF_2$, and aluminum fluoride with or without alkali metal fluoride or fluorides.

4 Claims, 3 Drawing Figures

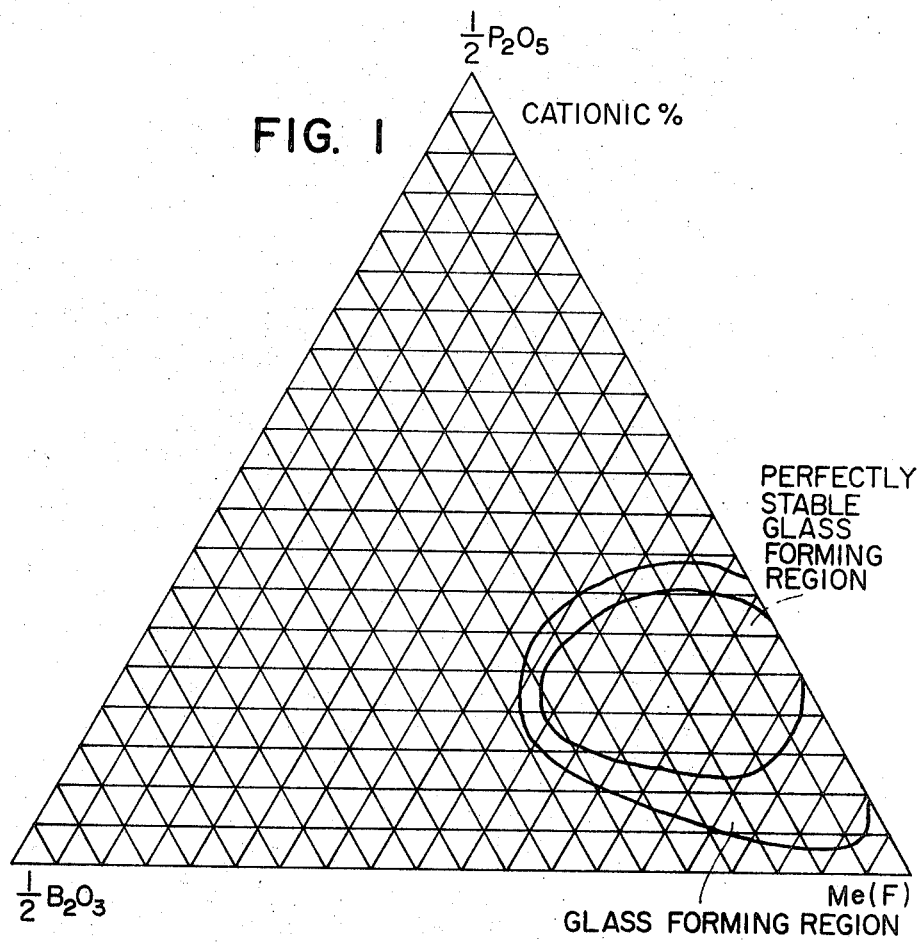

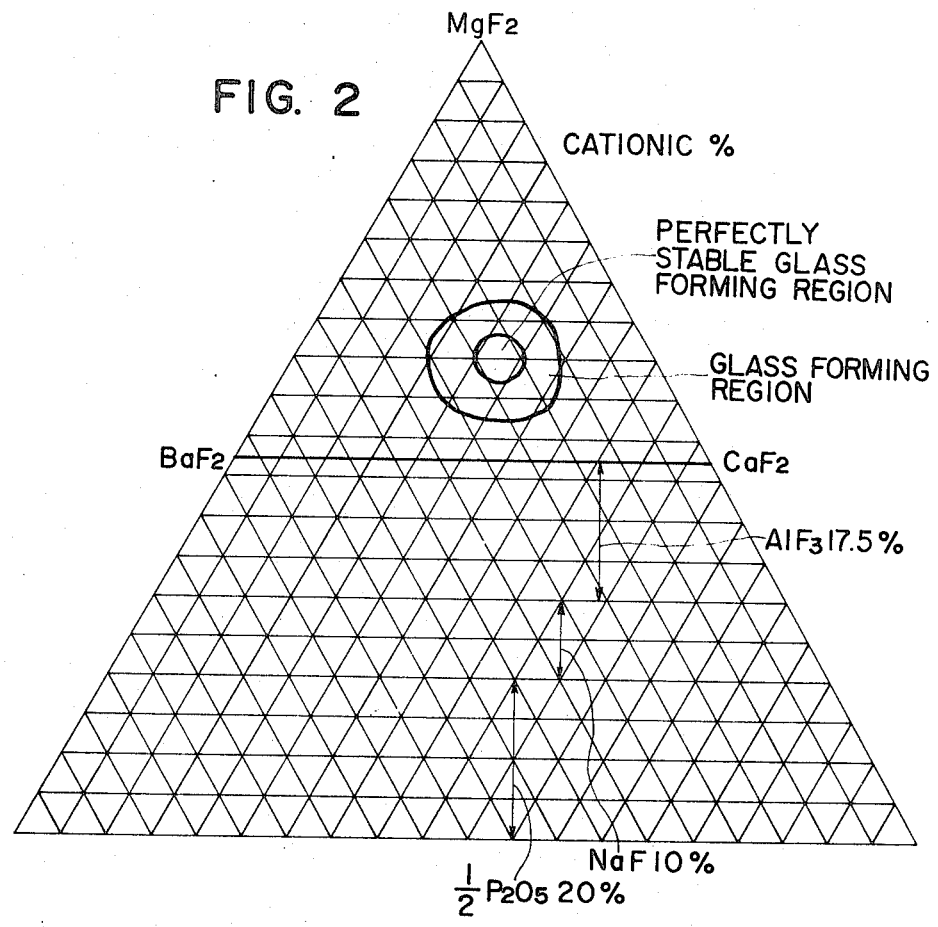

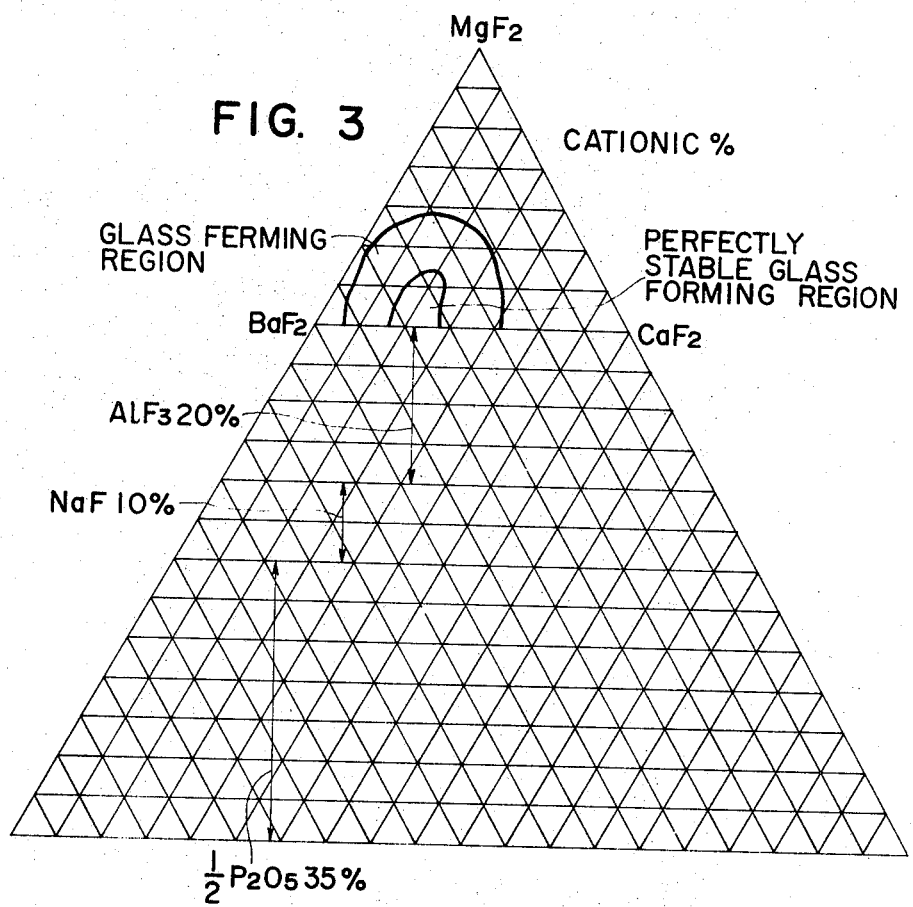

STABLE FLUOROPHOSPHATE OPTICAL GLASS

The present invention relates to optical glass, and more particularly, to an fluorophosphate glass which is improved as to devitrification, water-durability and brittleness.

There have been produced heretofore optical glass having a high Abbe's number consisting of as a main component beryllium fluoride or phosphoric acid and as additives metal fluorides. Those consisting of mainly beryllium fluoride had a tendency to devitrify, and those consisting of mainly phosphoric anhydride were rather suitable for a mass production. However, the latter could not be said to be satisfactorily non-devitrifiable and water-durable. Further, these types of glasses were undesirably subject ot a propagation of crack.

Therefore, an object of the present invention is to provide a fluorophosphate glass which is stable so as to have a low tendency to devitrify and which has a high water durability.

Another object of the present invention is to provide a fluorophosphate glass which is not subject to the propagation of crack.

Still another object of the present invention is to provide such a glass suitable for a mass production.

In the following description of the present invention, reference is made to the Figures of accompanying drawings, in which:

FIG. 1 represents a glass forming region and a perfectly stable glass forming region in the ternary system ½ $P_2O_5$–½ $B_2O_3$–Me(F) when Me(F) is a mixture consisting by cationic part of 15 parts of NaF, 23 parts of $AlF_3$, 10 parts of $MgF_2$, 14 parts of $BaF_2$ and 18 parts of $CaF_2$;

FIG. 2 represents those regions in the same ternary system, when ½ $P_2O_5$, $AlF_3$ and NaF are by cationic percent 20, 17.5 and 10 respectively; and FIG. 3 represents similarly those regions in the same ternary system, when ½ $P_2O_5$, $AlF_3$ and NaF are by cationic percent 35, 20 and 10 respectively.

The present inventors have discovered that in the ½ $P_2O_5$–½ $B_2O_3$Me(F) ternary system formed from the binary phosphoric anhydride-fluoride system with an addition of boron oxide as a new component, a glass forming region is extended as shown in FIG. 1. In the accompanying Figures, Me(F) represents a mixture consisting of metal fluorides such as NaF, $AlF_3$, $MgF_2$, $BaF_2$ and $CaF_2$ in an appropriate ratio, and the term "a perfectly stable glass forming region" means such that 100 c.c. of the glass do not devitrify even by maintaining the same at various temperatures for 20 minutes. Further, the ternary system ½ $P_2O_5$–½ $B_2O_3$–Me(F) has been found capable of producing a glass which is improved in its water-durability and unsusceptibility to the propagation of crack.

In order to improve the water-durability, there have been incorporated heretofore high electro-charge fluorides such as zirconium fluoride, rare earth metal fluorides, thorium fluoride. Such fluorides, however, all do not dissolve respectively in the glass in a desired amount and have a detrimental effect on the stability of the glass with regard to devitrification. Contrasting with this, if some boron oxide is incorporated, for example, 20-30 cationic parts of ½ $B_2O_3$ on the basis of 100 cationic parts of phophoric anhydride in the glass are incorporated, the stability and water-durability are remarkably enhanced, and further, boron oxide can be stably introduced up to an amount of 70 cationic parts. This can be seen from FIG. 1 in which the glass forming region is extended by the incorporation of boron oxide. Further, the incorporation of ½ $B_2O_3$ has not a detrimental influence on optical indices.

The glass of the present invention has the basic composition, ½ $P_2O_5$–½ $B_2O_3$–Me(F), wherein by cationic percent ½ $P_2O_5$ is in the range of 15 to 40% and ½ $B_2O_3$ is 0.5 to 21%, B/P being lower than 0.7. Me(F) represents R'F (alkali metal fluorides such as NaF, KF, LiF and the like), R''$F_2$ (alkaline earth metal fluoride such as $MgF_2$ and $BaF_2$ and $CaF_2$) and $AlF_3$. The range of the alkali metal fluoride is 0–40% and that of $AlF_3$ is 10–25%, above which ranges each can not be stably dissolved in the glass. With lower than 15% of phosphoric anhydride, the glass becomes unstable and with above 40%, Abbe's number is lowered so that preferably optical properties can not be obtained. If boron oxide is lower than 0.5%, the aforementioned effect can not obtained, while if it higher than 21%, the glass is unstable. Further, the alkaline earth metal fluorides consist of three components, $MgF_2$, $CaF_2$ and $BaF_2$ and the total of them should be 10–60%. If it is higher than 60%, the stability of the glass with respect to devitrification is poor and lower than 10% do not give preferably optical indices to the glass because of the reduction of Abbe's number. The compositional ratio of $MgF_2$, $CaF_2$ and $BaF_2$ depends on mainly an amount of phosphoric anhydride. For example, in the case of 20% ½ $P_2O_5$, 10% of NaF and 17.5% $AlF_3$, the region defined by 10–40% $MgF_2$, 20–50% $BaF_2$ and 30–60% $CaF_2$, wherein the calculation is carried out as the total of those divalent components is 100%, is capable of producing a stable glass, as shown in FIG. 2. Alternatively, in the case of 35% ½ $P_2O_5$, 10% NaF and 20% $AlF_3$, the region defined by 0–45% $MgF_2$, 30–90% $BaF_2$ and 10–60% $CaF_2$ is capable of producing a stable glass. Thus, the contents of alkaline earth metal fluorides should be in the range defined by the following equations respectively:

| | |
|---|---|
| $MgF_2$ | 13–⅔ (P=15) ~ 45% |
| $BaF_2$ | 17+⅔ (P–15) ~ 40+2 (P–15)% |
| $CaF_2$ | 37–4/3 (P–15) ~ 60% | wherein P is an amount by cationic percent of phosphoric anhydride. A portion of these R''$F_2$ components may be replaced by other R''$F_2$.

The present invention will be explained with respect to the following example in which the content of each component is based on cationic percent. Example Each glass composition as indicated in the following Table was prepared and mixed. The mixture was charged in a platinum crucible having a capacity of 800 c.c. and heated at a temperature of about 1,000° C to be fully vitrified. Then, the temperature was lowered to 900°–850° C. After stirring for 20 minutes, the melt was refined for 60 minutes and then again stirred for 10 minutes. Thereafter, with stirring, the temperature was lowered to 650° C and the melt was poured into a metal mold. In the Table, Glass No. 1 represents a contrast.

We claim:
1. A stable fluoro-phosphate optical glass consisting essentially of, by cationic percent, of 15–40% ½$P_2O_5$, 0.5–21% ½$B_2O_3$, B/P being less than 0.7, 0–40% alkali metal fluoride or fluorides, 10–60% alkaline earth metal fluorides and 10–25% $AlF_3$, said optical glass further characterized by exhibiting $^nd$ values within the range of 1.47 to 1.54 and $\gamma d$ values in the range of from 84.23 to 71.60.

2. A stable fluoro-phosphate optical glass according to claim 1 in which said alkali metal fluoride is selected from a group consisting of lithium fluoride, sodium fluoride and potassium fluoride.

3. A stable fluoro-phosphate optical glass according to claim 1 in which said alkaline earth metal fluoride is selected from a group consisting of magnesium fluoride, barium fluoride and calcium fluoride.

4. A stable fluoro-phosphate optical glass according to claim 3 in which said alkaline earth metal fluorides are in the following ranges by cationic percent respectively, when calculated as $MgF_2 + BaF_2 + CaF_2 = 100\%$:

| | |
|---|---|
| $MgF_2$ | 13–⅔ (P–15) ~ 45% |
| $BaF_2$ | 17+⅔ (P–15) ~ 40++2 (P–15)% |
| $CaF_2$ | 37–4/3 (P–15) ~ 60% | where P represents an amount of phosphoric anhydride by cationic percent.

* * * * *